(12) United States Patent
Ott

(10) Patent No.: US 6,449,253 B1
(45) Date of Patent: Sep. 10, 2002

(54) METHOD AND SYSTEM FOR DYNAMIC ALLOCATION OF BANDWIDTH IN ASYNCHRONOUS TRANSFER MODE (ATM) SWITCHING SYSTEMS

(75) Inventor: Teunis J. Ott, Chester, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/141,253

(22) Filed: Aug. 27, 1998

Related U.S. Application Data

(63) Continuation-in-part of application No. 09/006,961, filed on Jan. 14, 1998, now abandoned.
(60) Provisional application No. 60/064,224, filed on Oct. 29, 1997.

(51) Int. Cl.[7] ............................................... H04L 12/26
(52) U.S. Cl. ................... 370/231; 370/232; 370/395.43
(58) Field of Search .............................. 370/230, 395.1, 370/395.4, 236.1, 236, 468, 477, 229–235, 395.21, 395.41, 395.43

(56) References Cited

U.S. PATENT DOCUMENTS

| | | | |
|---|---|---|---|
| 5,396,494 A | 3/1995 | Roposh | 370/85.2 |
| 5,448,567 A | 9/1995 | Dighe et al. | 370/94.2 |
| 5,675,576 A | 10/1997 | Kalampoukas et al. | 370/232 |
| 5,701,291 A | 12/1997 | Roberts | 370/232 |
| 5,754,530 A | 5/1998 | Awdeh et al. | 370/232 |
| 5,784,358 A | 7/1998 | Smith et al. | 370/230 |
| 5,966,381 A | 10/1999 | Buckley et al. | 370/395 |
| 6,052,361 A * | 4/2000 | Ansari et al. | 370/232 |
| 6,069,872 A * | 5/2000 | Bonomi et al. | 370/236 |
| 6,178,159 B1 * | 1/2001 | He et al. | 370/234 |
| 6,252,847 B1 * | 6/2001 | Lee | 370/229 |

* cited by examiner

Primary Examiner—Melvin Marcelo
Assistant Examiner—Ronald Abelson
(74) Attorney, Agent, or Firm—William A. Schoneman; Joseph Giordano

(57) ABSTRACT

A method and system for dynamically adjusting the total bandwidth that an asynchronous transfer mode (ATM) switching system can make available to Available Bit Rate (ABR) virtual circuits comprise the steps of by determining a set of weighted "cutoffs" for the ABR virtual circuits, respectively, determining a first total expected rate (Exp_Rate) for recently active virtual circuits that are bottlenecked elsewhere based on the weighted cutoffs, setting a second total expected rate for active virtual circuits that are bottlenecked elsewhere to the first total expected rate, determining a total bandwidth available in the switching system for active virtual circuits that are bottlenecked in the switching system based on the first total expected rate, and setting to zero the first total expected rate. Furthermore, the method and system dynamically adjust the total bandwidth that the switching system can make available to ABR virtual circuits by recomputing, at fixed time intervals, the total bandwidth that is available to the active ABR virtual circuits that are bottlenecked at the switching system.

7 Claims, 12 Drawing Sheets

METHOD AND SYSTEM FOR DYNAMIC ALLOCATION OF BANDWIDTH IN ASYNCHRONOUS TRANSFER MODE (ATM) SWITCHING SYSTEMS

CROSS-REFERENCE TO RELATED APPLICATIONS

This application is a continuation-in-part of U.S. application Ser. No. 09/006,961, filed Jan. 14, 1998 subsequently abandoned, and claims the benefit of U.S. Provisional Application No. 60/064,224, filed Oct. 29, 1997 Provisional application expired, the contents of both of which are hereby incorporated by reference.

STATEMENT REGARDING FEDERALLY SPONSORED RESEARCH OR DEVELOPMENT

This invention was made with Government support under contract number F30602-96-C-0260 awarded by the Department of Air Force.

BACKGROUND OF THE INVENTION

The present invention relates generally to asynchronous transfer mode (ATM) switching systems, and more particularly, to a method and system for dynamically allocating bandwidth to Available Bit Rate (ABR) virtual circuits in ATM switching systems.

In an ATM network, a virtual source (VS) transmits data in the form of fixed sized cells to a virtual destination (VD) through a connection (referred to as virtual circuit) established between the virtual source and the virtual destination. The virtual source and virtual destination may be a telephone, video equipment, facsimile, computer, edge-router, edge-switch, etc. The cells may include any type of digitized information, including audio, computer data, video, multimedia, Internet data, etc. For example, in a network that uses Transmission Control Protocol/Internet Protocol (TCP/IP) over ATM, a virtual source may be an edge-router at the entry to an ATM network. An entry edge-router segments the incoming TCP/IP data packets into one or more ATM cells before transmitting each cell to the ATM network. Similarly, a virtual destination may be an edge router at the exit of the ATM network. An exit edge-router reassembles incoming ATM cells into TCP/IP data packets before transmitting each packet to its destination.

When establishing a virtual circuit through an ATM network, a virtual source can select one of five different categories of service: Constant Bit rate (CBR), Variable Bit Rate—Real Time (VBR-RT), Variable Bit Rate—Non Real Time (VBR-NRT), Available Bit Rate (ABR), and Unspecified Bit Rate (UBR). ATM Forum Traffic Management Standard af-tm-0056.00 describes each of these services.

The ABR service determines excess bandwidth in the network and uses network management methods to reallocate the excess bandwidth among the virtual circuits in the network to reduce network congestion and cell loss. In negotiating an ABR virtual circuit, a virtual source negotiates a peak cell rate (PCR) and a minimum cell rate (MCR) with the ATM network. PCR is the maximum cell rate a virtual circuit can support. MCR is the minimum cell rate that a virtual circuit must support. The ABR service uses the negotiated PCR and MCR parameters to provide a guaranteed quality of service concerning bandwidth availability and cell loss in a virtual circuit.

When a virtual source selects the ABR service, the virtual source periodically generates a resource management. (RM) cell to get feedback from the network on the rate at which the virtual source can transmit cells on a virtual circuit without causing loss of cells due to network congestion. Typically, a virtual source generates an RM cell for every thirty-one cells it transmits or at the expiration of a fixed time interval, whichever occurs first. The network processes the RM cell, updates virtual circuit bandwidth information in the RM cell, and returns the RM cell to the virtual source. The virtual source then dynamically adjusts its rate of cell transmission based on the bandwidth information contained in the RM cell.

An RM cell generated by a virtual source is referred to as a Forward RM cell. The Forward RM cell passes through one or more switching systems in the network before reaching a virtual destination. The virtual destination processes the Forward RM cell and returns a Backward RM cell to the virtual source. The Backward RM cell passes through one or more switching systems in the network before reaching the virtual source.

A virtual source maintains the MCR, current Allowed Cell Rate (ACR), and the PCR associated with the virtual circuit. ACR is the rate at which the network allows the virtual source to transmit cells on a virtual circuit. When a virtual source receives a Backward RM cell, based on the bandwidth information in the Backward RM cell, the virtual source computes a new ACR. Consequently, ACR dynamically changes as the network traffic changes and as the virtual source receives feedback from the network.

A Forward RM cell includes an MCR field, current cell rate (CCR) field, and an explicit rate (ER) field. CCR is the rate at which a virtual source is transmitting cells on a virtual circuit at the time the virtual source generates a Forward RM cell. ER is the rate at which the virtual source wishes to transmit cells on a virtual circuit. A virtual source cannot set the ER field in a Forward RM cell to be greater than PCR. After generating a Forward RM cell and setting the MCR, CCR, and ER fields in the Forward RM cell, the virtual source transmits the Forward RM cell to the network.

When a virtual source transmits a Forward RM cell, the Forward RM cell passes through each switching system on the path of the virtual circuit to the virtual destination. Each switching system on the path can either keep the ER in the Forward RM cell the same or decrease the ER to a lower rate. However, according to ATM Forum Traffic Management Standard, af-tm-0056.00, a switching system cannot decrease the ER below the MCR for the virtual circuit. Furthermore, a switching system cannot increase the ER for the virtual circuit. A switching system that allocates bandwidth to a virtual source by setting the ER field in an RM cell is referred to as an ABR Explicit Rate (ABR-ER) switching system.

When a Forward RM cell associated with a virtual circuit arrives at an ABR-ER switching system, the switching system determines an upper threshold (referred to as "cutoff") for the bandwidth that can be made available to the virtual circuit in the switching system. If the switching system determines that the computed cutoff for the virtual circuit sets the ACR in the virtual source (i.e, the switching system computes the smallest cutoff among all of the switching systems on the path of the virtual circuit), then the switching system considers the virtual circuit to be "bottlenecked here" or bottlenecked in the switching system. If the switching system determines that the computed cutoff does not set the ACR in the virtual source (i.e, the switching system does not compute the smallest cutoff among all of the switching systems on the path of the virtual circuit), then the switching system identifies the virtual circuit as "bottlenecked elsewhere."

The switching system determines a new bandwidth that it can allocate to the virtual circuit by determining a new ER for the virtual circuit and setting the new ER in the Forward RM cell. The switching system then determines an estimated rate (Exp_Rate) at which the switching system "expects" the virtual source to transmit data cells after the virtual source adjusts its ACR based on the newly set ER. Finally, the switching system sends the Forward RM cell to the next switching system on the path of the virtual circuit.

When the Forward RM cell reaches the virtual destination, the virtual destination returns the Forward RM cell as a Backward RM cell. The Backward RM cell passes through one or more switching systems on the path of the virtual circuit without any further modification to the bandwidth information set in the Forward RM cell. When the Backward RM cell reaches the virtual source, the virtual source uses the new ER in the RM cell to determine a new ACR. Based on the new ACR, the virtual source adjusts the rate at which it transmits cells.

Every time a switching system determines a cutoff and ER for a virtual circuit, the switching system also recomputes certain global bandwidth parameters for the virtual circuits that the switching system handles. These global bandwidth parameters include the total bandwidth available to all ABR-ER virtual circuits, the total Exp_Rate for ABR-ER virtual circuits that are bottlenecked elsewhere, the total number of ABR-ER virtual circuits that are bottlenecked elsewhere, and the total number of ABR-ER virtual circuits that are bottlenecked at the switching system.

Methods for determining and updating the global bandwidth parameters in an ABR-ER switching system are known. However, these methods have the disadvantage that every time a switching system recomputes the global bandwidth parameters that the switching system maintains on its virtual circuits, the computations introduce errors in the form of round-off errors into the global bandwidth parameters. Over the life of the vial circuits, as the switching system recomputes the global bandwidth parameters, the round-off errors can accumulate, and as a result of the accumulated errors, the parameters gradually become inaccurate.

When an ABR-ER switching system maintains inaccurate global bandwidth parameters, the switching system fails to allocate an optimum bandwidth to each virtual circuit. Specifically, a switching system allocates an optimum bandwidth to a virtual circuit when the virtual source uses the entire or nearly the entire bandwidth allocated to the virtual circuit. If the global bandwidth parameters are inaccurate, the switching system may allocate an insufficient amount of bandwidth to a virtual circuit, even though the switching system may in fact have sufficient bandwidth available. Similarly, the switching system may allocate an excessive amount of bandwidth to a virtual circuit, even though the switching system may in fact have insufficient bandwidth available. In either case, the switching system would fail to allocate an optimum bandwidth to the virtual circuit.

The methods known prior to the present invention for determining and updating the global bandwidth parameters in an ABR-ER switching system have the additional disadvantage that, when a virtual circuit does not use the entire bandwidth a switching system allocates to it, the switching system cannot dynamically identify and reallocate the unused bandwidth to other virtual circuits in the switching system. For example, when a virtual source stops transmitting cells on a virtual circuit or transmits cells at a much lower rate than the bandwidth allocated to the virtual circuit permits, the virtual source does not use the bandwidth allocated to the virtual circuit in an optimum fashion.

Furthermore, the methods known prior to the present invention for allocating bandwidth to an ABR virtual circuit have the disadvantage that a switching system may allocate more bandwidth to the virtual circuit than a virtual source could use. For example, when a virtual source requests an ER that is below the MCR for a virtual circuit, the switching system cannot decrease the ER below the MCR.

Therefore, it is desirable to have a method and system for overcoming the disadvantages of the prior art. It is also desirable to have a method and system to efficiently and effectively increase the total bandwidth that a switching system can make available to virtual circuits. It is further desirable to have a method and system for correcting, within a fixed time interval, the accumulation of computational errors in the global bandwidth parameters maintained in an ABR-ER switching system, identifying the unused bandwidth in virtual circuits, allocating the identified unused bandwidth to other virtual circuits in the switching system, and increasing the total bandwidth that the switching system can make available to virtual circuits.

DESCRIPTION OF THE INVENTION

The present invention comprises a method and system for dynamically adjusting the total bandwidth that an ABR-ER switching system can make available to ABR virtual circuits in the switching system by recomputing, at fixed time intervals, the total bandwidth that the switching system can make available to active ABR virtual circuits that are bottlenecked in the switching system. The method and system classifies the ABR virtual circuits that are established through an output port of the switching system into three categories of "recently active," "active," and "inactive" virtual circuits. An ABR virtual circuit is "recently active" if an output port receives at least one RM cell for the virtual circuit since the most recent recomputation of the total bandwidth that the switching system can make available to active ABR virtual circuits that are bottlenecked in the switching system (hereinafter referred to as "bandwidth allocation update"). An ABR virtual circuit is "active" if an output port receives at least one RM cell within the two most recent bandwidth allocation updates. An ABR virtual circuit is "inactive" if an output port does not receive at least one RM cell within the two most recent bandwidth allocation updates.

The present invention further comprises a method and system for dynamically adjusting the total bandwidth that an ABR-ER switching system can make available to ABR virtual circuits in the switching system by determining a set of weighted "cutoffs" for the ABR virtual circuits, respectively, determining a first total expected rate (Exp_Rate) for recently active virtual circuits that are bottlenecked elsewhere based on the weighted cutoffs, setting a second total expected rate for active virtual circuits that are bottlenecked elsewhere to the first total expected rate, determining a total bandwidth available in the switching system for active virtual circuits that are bottlenecked in the switching system based on the first total expected rate, and setting to zero the first total expected rate.

A switching system consistent with the present invention determines the total bandwidth allocated to inactive ABR virtual circuits in the switching system without explicitly identifying the inactive ABR virtual circuits, and makes available the bandwidth allocated to inactive ABR virtual circuits to active ABR virtual circuits that are established through the switching system. When transmission of cells resumes in an inactive ABR virtual circuit, the switching system reallocates new bandwidth to the virtual circuit.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1A:
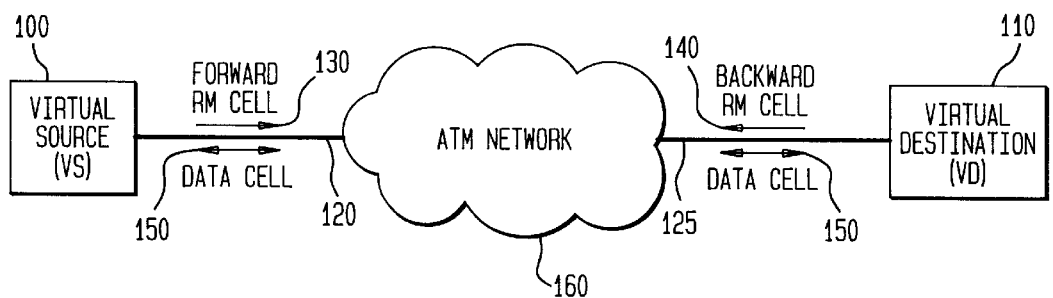
FIG. 1a is a block diagram of an ATM communications network.

FIG. 1a illustrates a block diagram of an ATM communications network in accordance with an embodiment of the invention. Virtual source (VS) 100 interfaces with ATM network 160 via transmission link 120. Virtual destination (VD) 110 interfaces with ATM network 160 via transmission link 125. When establishing a connection between VS 100 and VD 110, ATM network 160 sets up a virtual circuit (VC) (not shown) between VS 100 and VD 110. During the set-up phase of the connection, VS 100 negotiates with ATM network 160 for an Available Bit Rate-Explicit Rate (ABR-ER) service. Furthermore, during the set-up phase, a weight factor, W, is also assigned to the VC. The weight factor may depend on, for example, the tariff payed by the owner of the VC, the service priority of the VC, and/or the amount of traffic the VC is expected to carry.

After completion of the set-up phase of the connection, VS 100 generates Forward resource management (RM) cell 130 and transmits it on transmission link 120. Forward RM cell 130 passes through ATM network 160 and transmission link 125, and arrives at VD 110. VD 110 processes Forward RM cell 130, and generates Backward RM cell 140 in response to Forward RM cell 130. VD 10 then transmits Backward RM cell 140 on transmission link 125. Backward RM cell 140 passes through ATM network 160 and transmission link 120, and arrives at VS 100.

VS 100 generates data cell 150 and transmits it on transmission link 120. Data cell 150 passes through ATM network 160 and transmission link 125, and arrives at VD 110. Similarly, VD 110 generates data cell 150 and transmits it on transmission link Data cell 150 passes through ATM network 160 and transmission link 120, and arrives at VS 100.

Figure 1B:
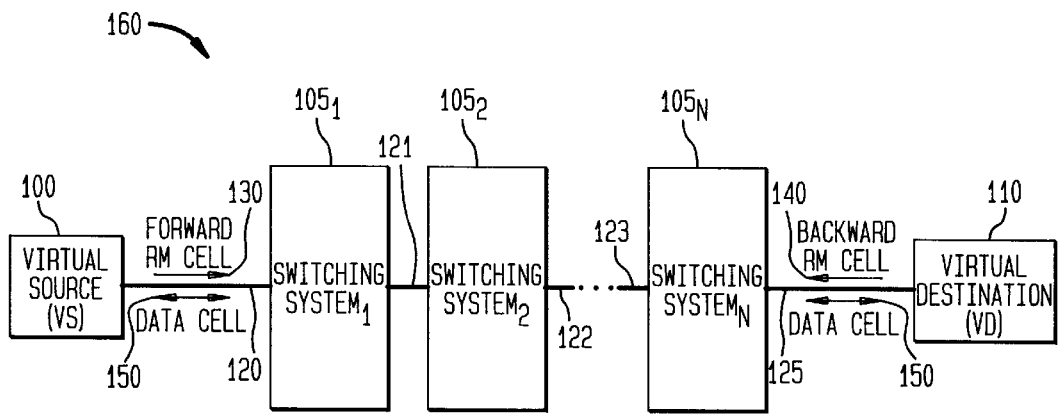
FIG. 1b is a block diagram of an end-to-end path of a virtual circuit that passes through N switching systems in an ATM communications network.

FIG. 1b illustrates a block diagram of the end-to-end path of a VC in ATM network 160 in accordance with an embodiment of the invention. The path of the VC established between VS 100 and VD 110 passes through N switching systems $105_1$ through $105_N$. Each switching system $105_1$ through $105_N$ connects to its adjacent switching system via a corresponding transmission link 121, 122, and 123.

SWITCHING SYSTEM

Figure 2:
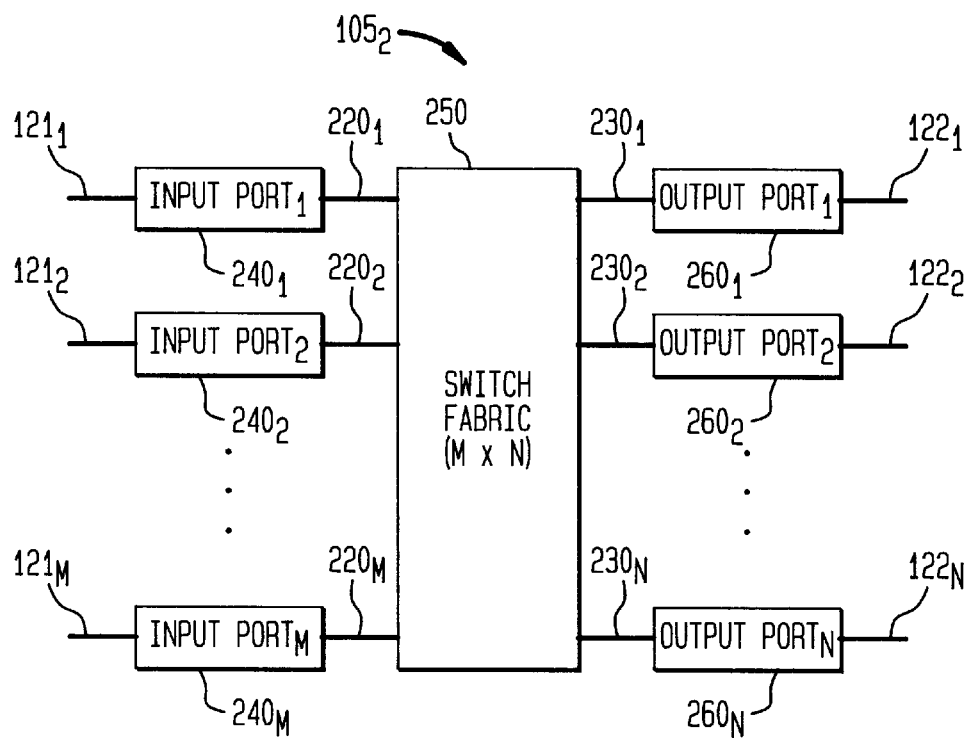
FIG. 2 is a block diagram of a switching system in accordance with an embodiment of the invention.

FIG. 2 illustrates a block diagram of a switching system, for example switching system $105_2$, in accordance with an embodiment of the invention. As shown, switching system $105_2$ comprises M input ports $240_1$ through $240_M$. Each input port interfaces with an input line, which can carry K virtual circuits (not shown), where K is an integer. For example, input port $240_M$ interfaces with input line $121_M$, which carries K virtual circuits. Input ports $240_1$ through $240_M$ preferably interface with a cross-point switch fabric 250 via input links $220_1$ through $220_M$ respectively. Alternatively, switch fabric 250 may be a Batcher-Banyan switch network, Sunshine switch, or any other switch fabric capable of switching ATM cells.

Switch fabric 250 interfaces with N output ports $260_1$ through $260_N$ via output links $230_1$ through $230_N$ respectively. Each output port 260 interfaces with an output line 122, which can carry K virtual circuits.

OUTPUT PORTS

Figure 3:
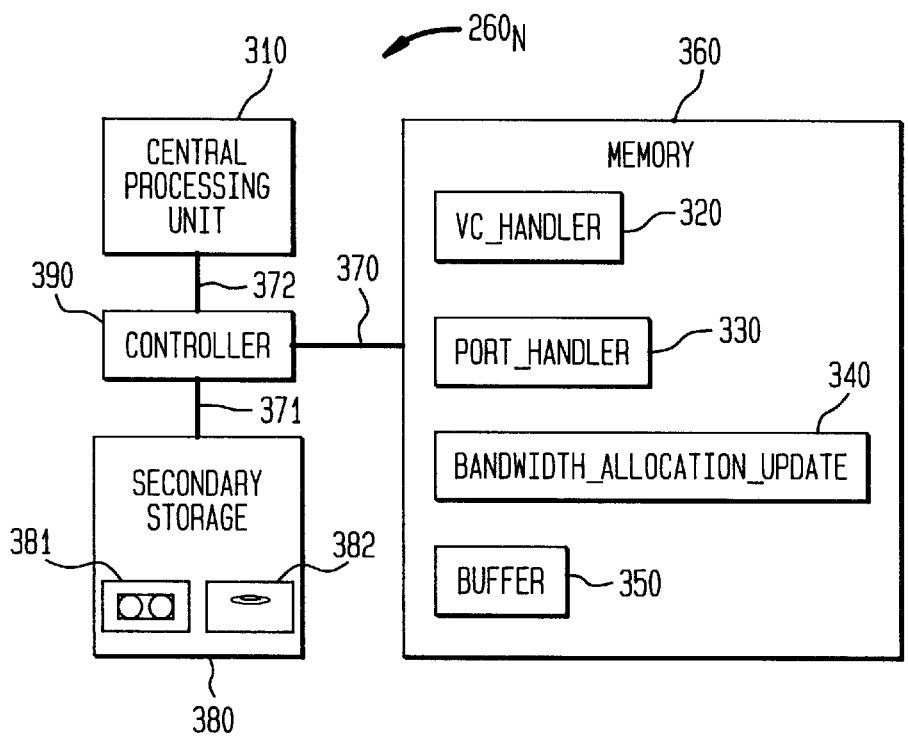
FIG. 3 is a block diagram of an output port in a switching system in accordance with an embodiment of the invention.

FIG. 3 illustrates a preferred embodiment for each output port $260_1$ through $260_N$ in accordance with an embodiment of the invention. As shown, each output port, for example output port $260_N$, preferably has access to central processing unit 310 (CPU), memory unit 360, controller 390, secondary storage 380, and high speed buses 370, 371, and 372. CPU 310 interfaces with controller 390 via high speed bus 372. Controller 390 interfaces with memory unit 360 and secondary storage 380 via high speed buses 370 and 371, respectively.

Memory unit 360 preferably includes VC_Handler 320, Port_Handler 330, Bandwidth_Allocation_Update 340, and Buffer 350. VC_Handler 320, Port_Handler 330, Bandwidth_Allocation_Update 340, and Buffer 350 each preferably include a set of instructions in the form of software, which CPU 310 executes. VC_Handler 320 receives and processes RM cells for virtual circuits $VC_1$ through $VC_K$ in output port $260_N$. Specifically, when a $VC_i$ receives an RM cell, where $1 \leq i \leq K$, Port_Handler 330 determines a new ER and Exp_Rate for the $VC_i$, and recomputes the global bandwidth parameters for all VCs (i.e., $VC_1$ through $VC_K$) it output port $260_N$. At fixed time intervals, Bandwidth_Allocation_Update 340 recomputes the total bandwidth that output port $260_N$ can make available to active VCs that are bottlenecked at output port $260_N$. Buffer 350 stores cells (i.e, data cells and RM cells) that arrive at output port $260_N$ in queues (not shown), which are in memory unit 360. Alternatively, each VC_Handler 320, Port_Handler 330, Bandwidth_Allocation_Update 340, and Buffers 350 may be implemented in hardware using hardware technology known to one of ordinary skill in the art to provide the functionality described herein.

Secondary storage 380 includes disk drive unit 382 and tape cartridge 381. Stored in disk drive unit 382 are software and data for switching system $105_2$. For example, disk drive unit 382 contains software for VC_Handler 320, Port_Handler 330, Bandwidth_Allocation_Update 340, and Buffer 350. Secondary storage 380 can copy software and data for switching system $105_2$ from tape cartridge 381 into disk drive unit 382. Controller 390 can then upload the software and data from disk drive unit 382 into memory unit 360. Similarly, controller 390 can download software and data from memory unit 360 into disk drive unit 382. Secondary storage 380 can then copy the downloaded software and data from disk drive unit 382 into tape cartridge 381.

VC_HANDLER

A VC_Handler processes and stores data specific to each virtual circuit $VC_1$ through $VC_K$ in an output port. Specifically, a VC_Handler preferably stores for each $VC_i$, where $1 \leq i \leq K$, a MCR, the time that an RM cell last arrived for the $VC_i$, an Exp_Rate, and a Bottlenecked_Elsewhere indicator. The VC_Handler sets Bottlenecked_Elsewhere indicator to a logical value of 1, when at the time the VC_Handler receives an RM cell for a $VC_i$, the $VC_i$ is bottlenecked elsewhere. If the $VC_i$ is instead bottlenecked at an output port of the switching system, then the VC_Handler sets Bottlenecked_Elsewhere indicator to a logical value of 0.

Figure 4:
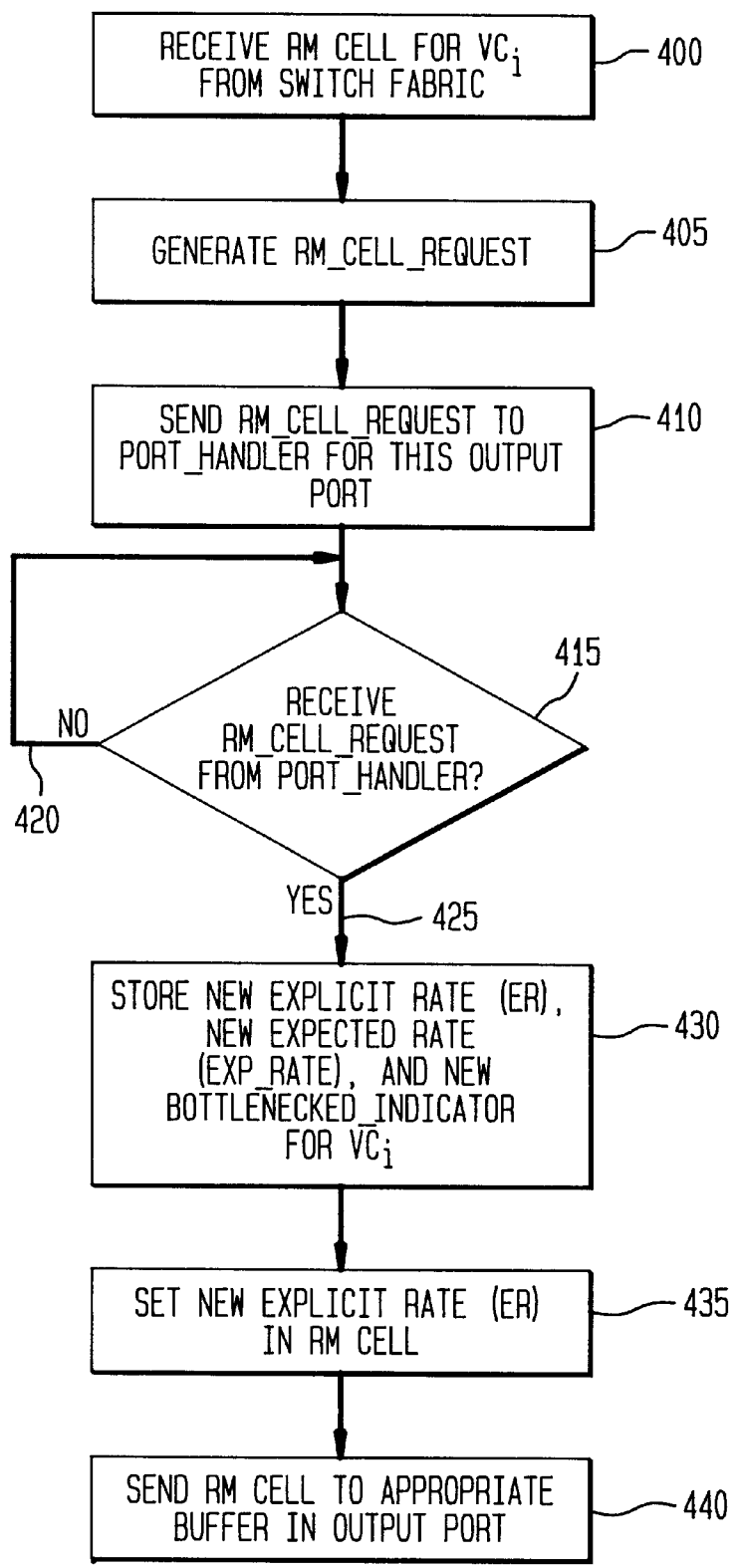
FIG. 4 is a flow chart of the steps a switching system performs to process a resource management cell in accordance with an embodiment of the invention.

FIG. 4 illustrates a flow chart of the steps a VC_Handler preferably performs to process an RM cell for a $VC_i$.

VC_Handler 320 receives RM cell 130 from switch fabric 250 (step 400). VC_Handler 320 then generates an RM_Cell_Request (step 405). An RM_Cell_Request includes a MCR, Bottlenecked_Elsewhere indicator, current Exp_Rate, CCR, and a current ER for the $VC_i$.

VC_Handler 320 then sends the RM_Cell_Request to Port_Handler 330 (step 410). Port_Handler 330 computes a new ER, Exp_Rate, and Bottlenecked_Elsewhere indicator, and incorporates them in the RM_Cell_Request.

VC_Handler 320 waits until it receives the RM_Cell_Request back from Port_Handler 330 (step 415). If VC_Handler 320 does not receive the RM_Cell_Request back from Port_Handler 330 (step 415), then VC_Handler continues to wait until it receives the RM_Cell_Request from Port_Handler 330 (step 420). If VC_Handler 320 receives the RM_Cell_Request back from Port_Handler 330, then VC_Handler 320 resumes the processing of the RM_Cell_Request (step 425).

VC_Handler 320 stores the new ER, Exp_Rate, and the Bottlenecked_Elsewhere indicator in memory unit 360 (step 430). Alternatively, VC_Handler 320 may store each of these values in a register. Finally, VC_Handler 320 replaces the current ER in RM cell 130 with the new ER in RM_Cell_Request (step 435). VC_Handler 320 then sends RM cell 130 to Buffer 350 in output port $260_N$ (step 440).

PORT_HANDLER

A Port_Handler determines a new ER and Exp_Rate for a $VC_i$, and recomputes the global bandwidth parameters for virtual circuits $VC_1$ through $VC_K$ in the corresponding output port. Specifically, a Port_Handler preferably stores a weight factor, $W_i$, for each $VC_i$, where $0 < W_i$ and $1 \leq i \leq K$, the time of the most recent bandwidth allocation update, the time of the second most recent bandwidth allocation update, the total bandwidth available to all VCs (i.e., CBR, VBR, ABR, and UBR VCs) in the output port, the total bandwidth available to all ABR VCs (i.e., active and inactive ABR VCs), the total Exp_Rate for active ABR VCs bottlenecked elsewhere, total Exp_Rate for recently active ABR VCs bottlenecked elsewhere, the total bandwidth available to ABR VCs bottlenecked at the output port, the sum of weight factors for active ABR VCs bottlenecked at the output port, and the sum of weight factors for recently active ABR VCs bottlenecked at the output port. When the Port_Handler receives an RM_Cell_Request from a VC_Handler, the Port_Handler recomputes the above mentioned global bandwidth parameters.

Figure 5:
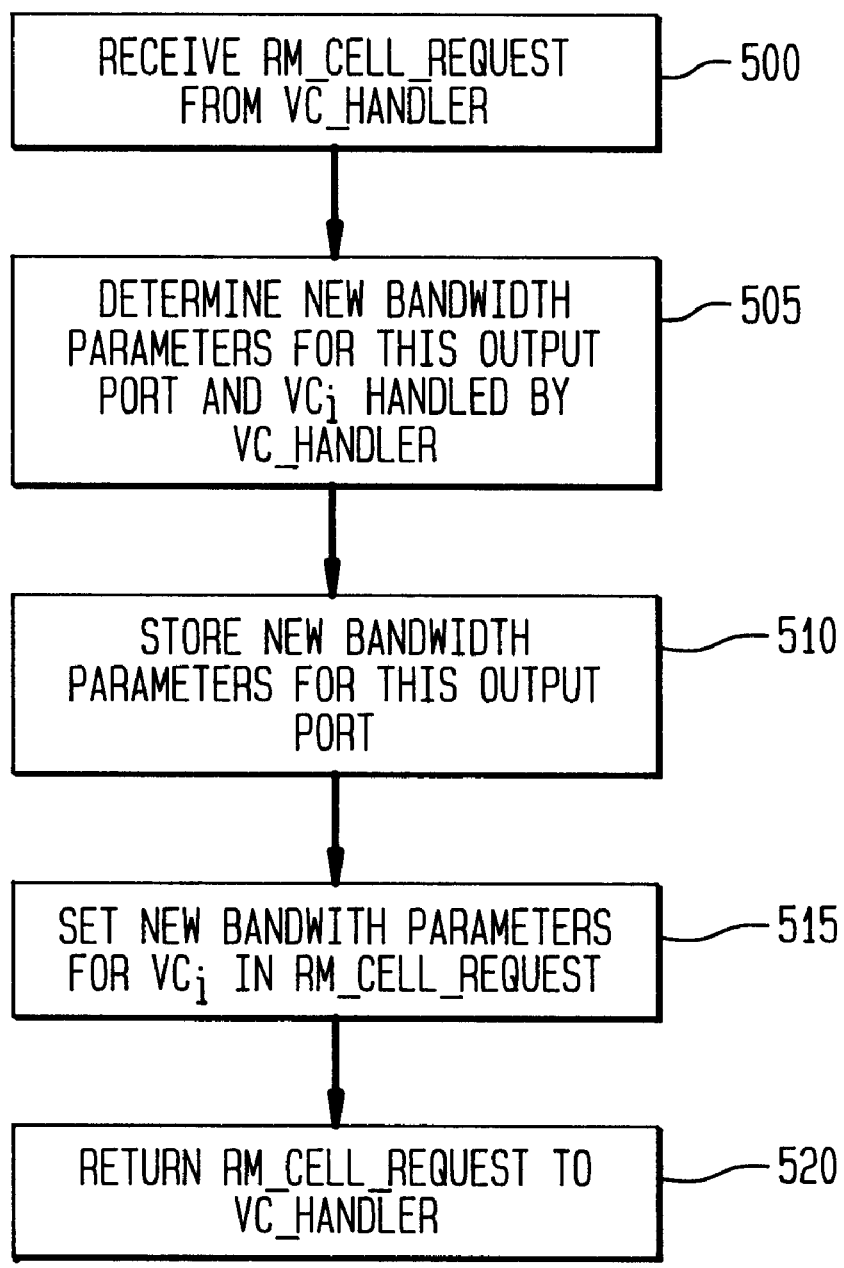
FIG. 5 is a flow chart of the steps a switching system performs to process a resource management cell in accordance with an embodiment of the invention.

FIG. 5 illustrates a flow chart of the steps a Port_Handler preferably performs to process an RM_Cell_Request for a $VC_i$. Port_Handler 330 receives RM_Cell_Request from VC_Handler 320 (step 500). Port_Handler 330, as explained below, recomputes global bandwidth parameters for output port $260_N$, and new ER and Exp_Rate for the $VC_i$ (step 505). Port_Handler 330 stores the new global bandwidth parameters for output port $260_N$ in memory unit 360 (step 510). Port_Handler 330 sets the global bandwidth parameters for the $VC_i$ in the RM_Cell_Request (step 515). Port_Handler 330 then returns the updated RM_Cell_Request to VC_Handler 320 (step 520).

Figure 6:
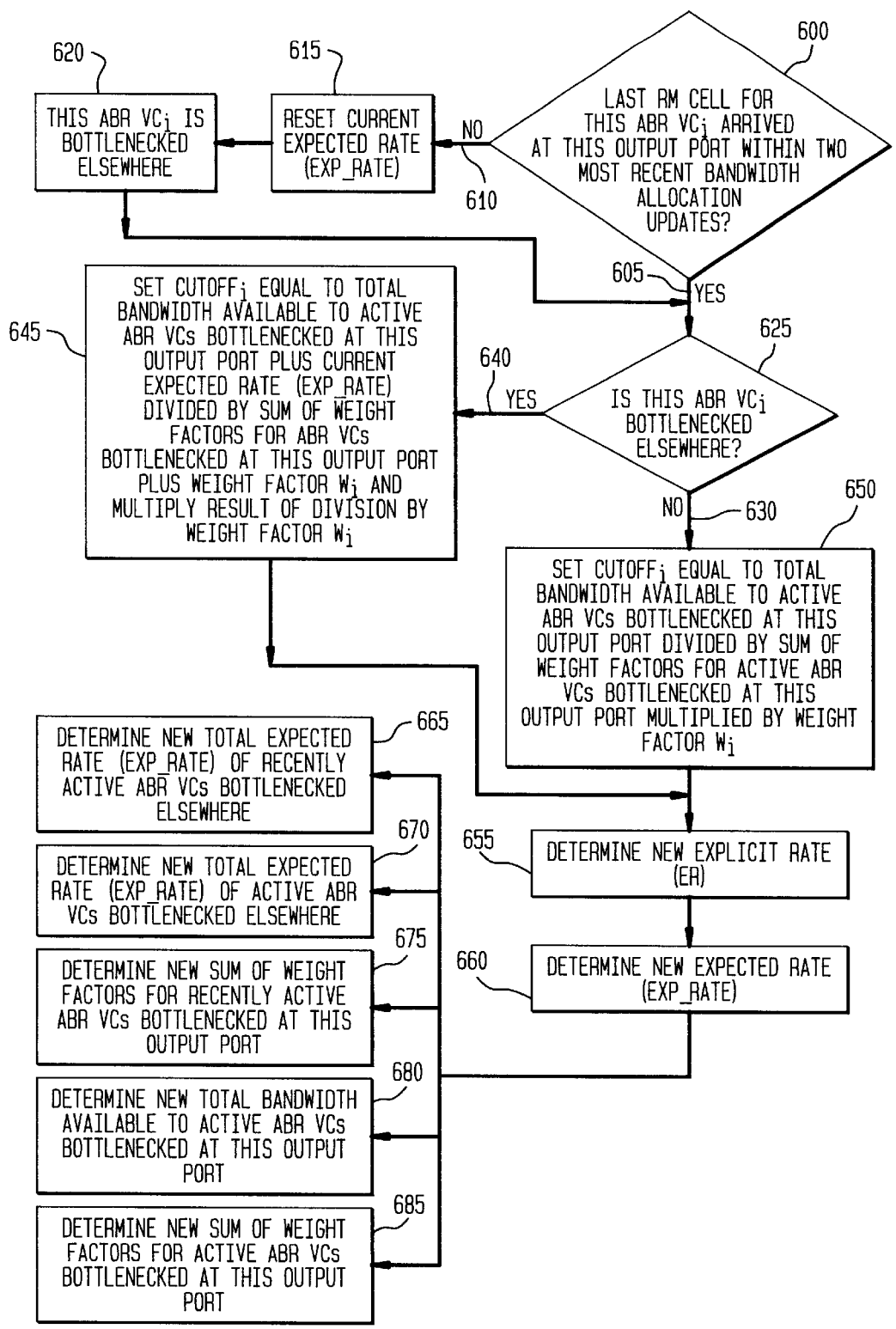
FIG. 6 is a flow chart of the steps a switching system performs to determine bandwidth parameters for an output port and a virtual circuit in accordance with an embodiment of the invention.

FIG. 6 illustrates a flow chart of the steps a Port_Handler preferably performs to determine new global bandwidth parameters for an output port and a $VC_i$. Port_Handler 330 determines whether the last RM cell for the $VC_i$ arrived at output port $260_N$ within the two most recent bandwidth allocation updates in output port $260_N$ (step 600).

If Port_Handler 330 determines that the last RM cell for the $VC_i$ arrived at output port $260_N$ before the two most recent bandwidth allocation updates in output port $260_N$ (step 610), Port_Handler 330 resets the current Exp_Rate for the $VC_i$ to zero (step 615), and determines that the $VC_i$ is bottlenecked elsewhere and sets the Bottlenecked_Elsewhere indicator in the RM_Cell_Request equal to a logical 1 (step 620). Port_Handler then determines whether the $VC_i$ is bottlenecked elsewhere (step 625).

If Port_Handler 330 determines that the last RM cell for the $VC_i$ arrived at output port $260_N$ within the two most recent bandwidth allocation updates in output port $260_N$ (step 605), then Port_Handler 330 determines whether the $VC_i$ is bottlenecked elsewhere (step 625).

If Port_Handler 330 determines that the $VC_i$ is bottlenecked elsewhere (step 640), then Port_Handler 330 determines an upper threshold, namely "$cutoff_i$," for the amount of bandwidth that output port $260_N$ can make available to the $VC_i$. Port_Handler 330 preferably determines cutoff for the $VC_i$ by dividing the total bandwidth available to active ABR VCs bottlenecked at output port $260_N$ plus the current Exp_Rate for the $VC_i$ by the sum of weight factors for active ABR VCs bottlenecked at output port $260_N$ plus weight factor, $W_i$, for the $VC_i$ and multiplying the result by $W_i$ (step 645). Step 645 may alternatively be expressed as follows:

$$cutoff_i = ((\text{Total Bandwidth Available To Active ABR VCs At Output Port } 260_N +$$
$$\text{Current Exp\_Rate For } VC_i)/$$
$$(\text{Sum Of Weight Factors For Active ABR VCs Bottlenecked At Output Port } 260_N + W_i)) * W_i$$

If Port_Handler 330 determines that the $VC_i$ is bottlenecked at output port $260_N$ (step 630), Port_Handler 330 sets $cutoff_i$ for the $VC_i$ equal to the total bandwidth available to active ABR VCs bottlenecked at output port $260_N$ divided by the sum of weight factors for active ABR VCs bottlenecked at output port $260_N$ multiplied by weight factor, $W_i$, for the $VC_i$ (step 650). Step 650 may alternatively be expressed as follows:

$$cutoff_i = (\text{Total Bandwidth Available To Active ABR VCs Bottlenecked At Output Port } 260_N)/$$
$$((\text{Sum of Weight Factors For Active ABR VCs Bottlenecked At Output Port } 260_N) * W_i)$$

Port_Handler 330 then, as explained below, determines a new ER for the $VC_i$ (step 655), a new Exp_Rate for the $VC_i$ (step 660), a new total Exp_Rate for recently active ABR VCs bottlenecked elsewhere (step 665), a new total Exp_Rate for active ABR VCs bottlenecked elsewhere (step 670), a new sum of weight factors for active ABR VCs bottlenecked at output port $260_N$ (step 675), a new total bandwidth that output port $260_N$ can make available to active ABR VCs bottlenecked at output port $260_N$ (step 680), and a new sum of weight factors for active ABR VCs bottlenecked at output port $260_N$ (step 685).

Figure 7:
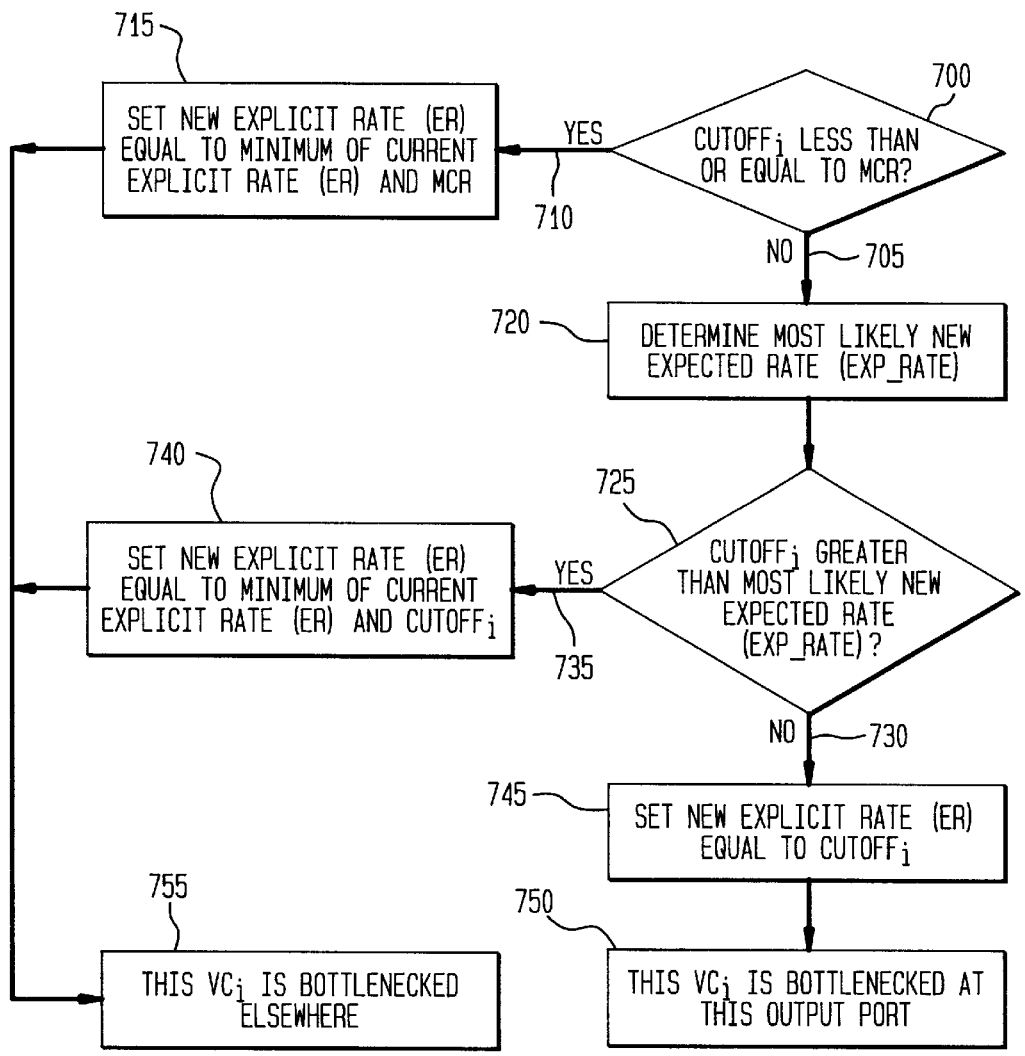
FIG. 7 is a flow chart of the steps a switching system performs to determine a new explicit rate for a virtual circuit in accordance with an embodiment of the invention.

FIG. 7 illustrates a flow chart of the steps a Port_Handler preferably performs to determine a new ER for a $VC_i$. Port_Handler 330 determines whether cutoff for the $VC_i$ is less than or equal to MCR for that $VC_i$ (step 700). If Port_Handler 330 determines that $cutoff_i$ for the $VC_i$ is greater than MCR (step 710), Port_Handler 330 sets the new ER equal to the minimum of the current ER and MCR (step 715). Port_Handler 330 then determines that the $VC_i$ is bottlenecked elsewhere, and sets the Bottlenecked_Elsewhere indicator in the RM_Cell_Request to a logical 1 (step 755).

If Port_Handler 330 determines that $cutoff_i$ for the $VC_i$ is less than or equal to MCR for that $VC_i$ (step 705), Port_Handler 330 determines a most likely new Exp_Rate for the $VC_i$ (step 720). Port_Handler 330 selects the maximum of CCR and MCR for the $VC_i$, and sets the most likely new Exp_Rate to the minimum of that maximum value and the current ER for the $VC_i$.

Port_Handler 330 determines whether $cutoff_i$ for the $VC_i$ is greater than the most likely new Exp_Rate for VC (step 725). If Port_Handler 330 determines that $cutoff_i$ is not greater than the most likely new Exp_Rate (step 735), then Port_Handler 330 sets the new ER for the $VC_i$ to the minimum of current ER and $cutoff_i$ (step 740). Port_Handler 330 then determines that the $VC_i$ is bottlenecked elsewhere and sets the Bottlenecked_Elsewhere indicator in the RM_Cell_Request to a logical 1 (step 755).

If Port_Handler 330 determines that $cutoff_i$ for the $VC_i$ is greater than the most likely new Exp_Rate (step 730), Port_Handler 330 sets the new ER equal to $cutoff_i$ (step 745). Port_Handler 330 then determines that the $VC_i$ is bottlenecked at output port $260_N$, and sets the Bottlenecked_Elsewhere indicator in the RM_Cell_Request to a logical 0 (step 750).

Figure 8:
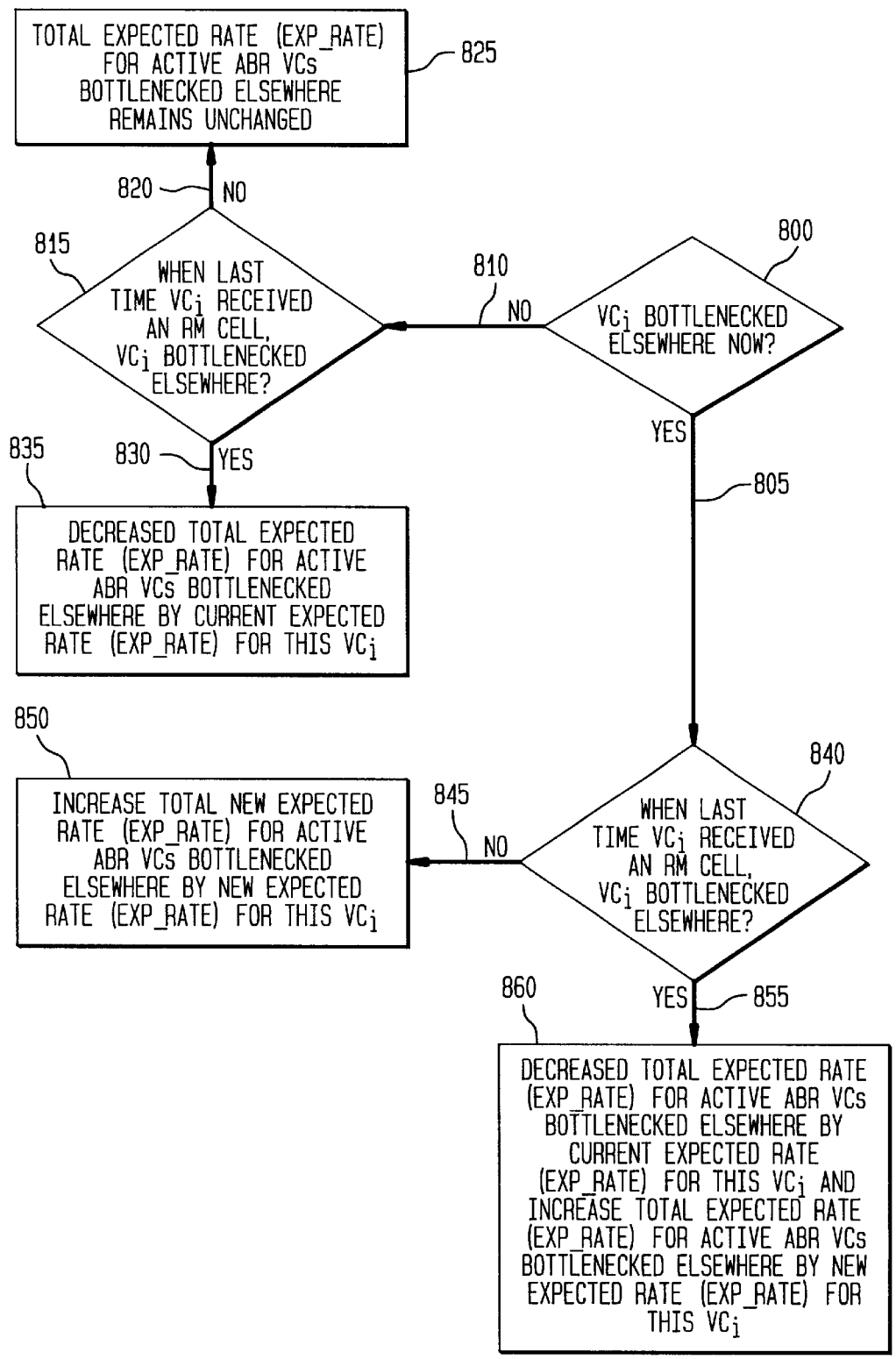
FIG. 8 is a flow chart of the steps a switching system performs to determine the total expected rate for active Available Bit Rate virtual circuits that are bottlenecked elsewhere in accordance with an embodiment of the invention.

FIG. 8 illustrates a flow chart of the steps a Port_Handler preferably performs to determine a new total Exp_Rate for active ABR VCs that are bottlenecked elsewhere. Port_Handler 330 determines whether a $VC_i$ is currently bottlenecked elsewhere (step 800). If Port-Handler 330 determines that the $VC_i$ is bottlenecked at output port $260_N$ (step 810), then Port_Handler 330 determines whether, when last time output port $260_N$ received an RM cell for that $VC_i$, the $VC_i$ was bottlenecked elsewhere (step 815). If Port_Handler 33 determines that last time the $VC_i$ was bottlenecked at output port $26_N$ (step 820), then Port_Handler 330 determines that the total Exp_Rate for active ABR VCs that are bottlenecked elsewhere remains unchanged (step 825).

If Port_Handler 330 determines that, when last time output port $260_N$ received an RM cell for the $VC_i$, the $VC_i$ was bottlenecked elsewhere (step 830), then Port_Handler 330 decreases the total Exp_Rate for active ABR VCs that are bottlenecked elsewhere by the current Exp_Rate for the $VC_i$ (step 835).

If Port_Handler 330 determines that the $VC_i$ is currently bottlenecked elsewhere (step 805), then Port_Handler 330 determines whether, when last time output port $260_N$ received an RM cell for that $VC_i$, the $VC_i$ was bottlenecked elsewhere (step 840). If Port_Handler 330 determines that last time the $VC_i$ was bottlenecked at output port $260_N$ (step 845), Port_Handler 330 increases the total Exp_Rate for active ABR VCs that are bottlenecked elsewhere by the new Exp_Rate for the $VC_i$ (step 850).

If Port_Handler 330 determines that last time the $VC_i$ was bottlenecked elsewhere (step 855), the Port_Handler 330 decreases the total Exp_Rate for active ABR VCs by the current Exp_Rate for the $VC_i$ and increases the total Exp_Rate for active ABR VCs by the new Exp_Rate for the $VC_i$ (step 860).

Figure 9:
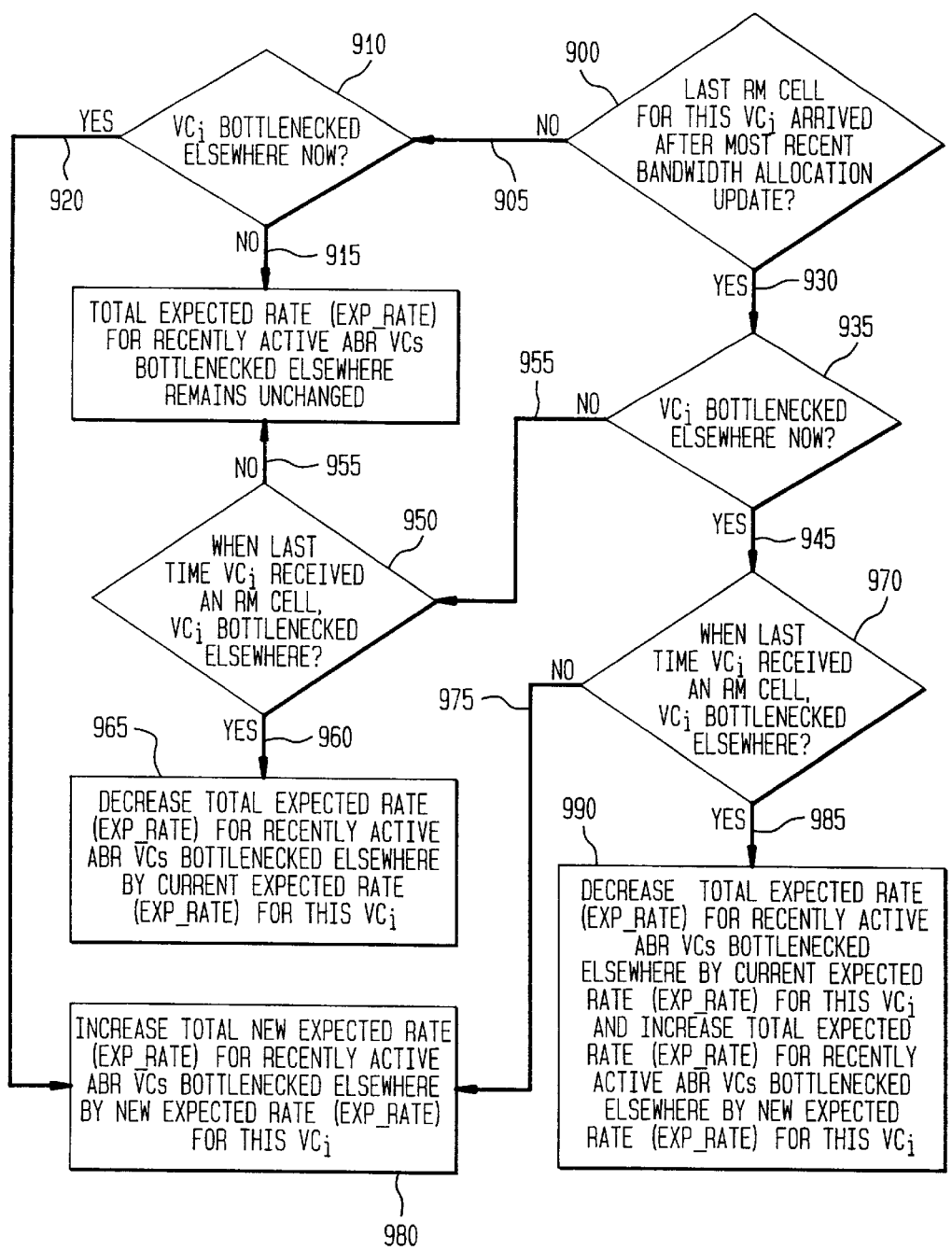
FIG. 9 is a flow chart of the steps a switching system performs to determine the total expected rate for recently active Available Bit Rate virtual circuits that are bottlenecked elsewhere in accordance with an embodiment of the invention.

FIG. 9 illustrates a flow chart of the steps a Port_Handler preferably performs to determine a new total Exp_Rate for recently active ABR VCs that are bottlenecked elsewhere. Port_Handler 330 determines whether the last RM cell for a $VC_i$ arrived at output port $260_N$ after the most recent bandwidth allocation update in output port $260_N$ (step 900).

If Port_Handler 330 determines that the last RM cell for the $VC_i$ arrived at output port $260_N$ before the most recent bandwidth allocation update in output port $260_N$ (step 905), then Port_Handler 330 determines whether the $VC_i$ is currently bottlenecked elsewhere (step 920). If Port_Handler determines that the $VC_i$ is currently bottlenecked elsewhere (step 920), the Port_Handler 330 increases the total Exp_Rate for recently active ABR VCs that are bottlenecked elsewhere by the new Exp_Rate for the $VC_i$ (step 980).

If Port_Handler 330 determines that the $VC_i$ is currently bottlenecked at output port $260_N$ (step 915), then Port_Handler 330 determines that the total Exp_Rate for recently active ABR VCs that are bottlenecked elsewhere remains unchanged (step 925).

If Port_Handler 330 determines that last RM cell for $VC_i$ arrived after the most recent bandwidth allocation update in output port $260_N$ (step 930), then Port_Handler 330 determines whether the $VC_i$ is currently bottlenecked elsewhere (step 935). If Port_Handler 330 determines that the $VC_i$ is bottlenecked at output port $260_N$ (step 940), then Port_Handler 330 determines whether, when last time output port $260_N$ received an RM cell for that $VC_i$, the $VC_i$ was bottlenecked elsewhere (step 950). If Port_Handler 330 determines that last time the $VC_i$ was bottlenecked at output port 26Q, (step 955), then Port_Handler 330 determines that the total Exp_Rate for recently active ABR VCs that are bottlenecked elsewhere remains unchanged (step 925).

If Port_Handler 330 determines that the $VC_i$ is bottlenecked at output port $260_N$ (step 940) and determines that, when last time output port $260_N$ received an RM cell for that $VC_i$, the $VC_i$ was bottlenecked elsewhere (step 960), then Port_Handler 330 decreases the total Exp_Rate for recently active ABR VCs that are bottlenecked elsewhere by the current Exp_Rate for the $VC_i$ (step 965).

If Port_Handler 330 determines that last RM cell for the $VC_i$ arrived after the most recent bandwidth allocation update in output port $260_N$ (step 930) and determines that the $VC_i$ is currently bottlenecked elsewhere (step 945), then Port_Handler 330 determines whether, when last time output port $260_N$ received an RM cell for that $VC_i$, the $VC_i$ was bottlenecked elsewhere (step 970). If Port_Handler determines that last time the $VC_i$ was bottlenecked at output port $260_N$ (step 975), then Port_Handler 330 increases the total Exp_Rate for recently active ABR VCs that are bottlenecked elsewhere by the new Exp_Rate for the $VC_i$ (step 980).

If Port_Handler 330 determines that last RM cell for the $VC_i$ arrived after the most recent bandwidth allocation update in output port $260_N$ (step 930), determines that the $VC_i$ is currently bottlenecked elsewhere (step 945), and determines that, when last time output port $260_N$ received an RM cell for that $VC_i$, the $VC_i$ was bottlenecked elsewhere (step 985), then Port_Handler 330 decreases the total Exp_Rate for recently active ABR VCs that are bottlenecked elsewhere by the current Exp_Rate for the $VC_i$ and increases the total Exp_Rate for recently active ABR VCs that are bottlenecked elsewhere by the new Exp_Rate for the $VC_i$ (step 990).

Figure 10:
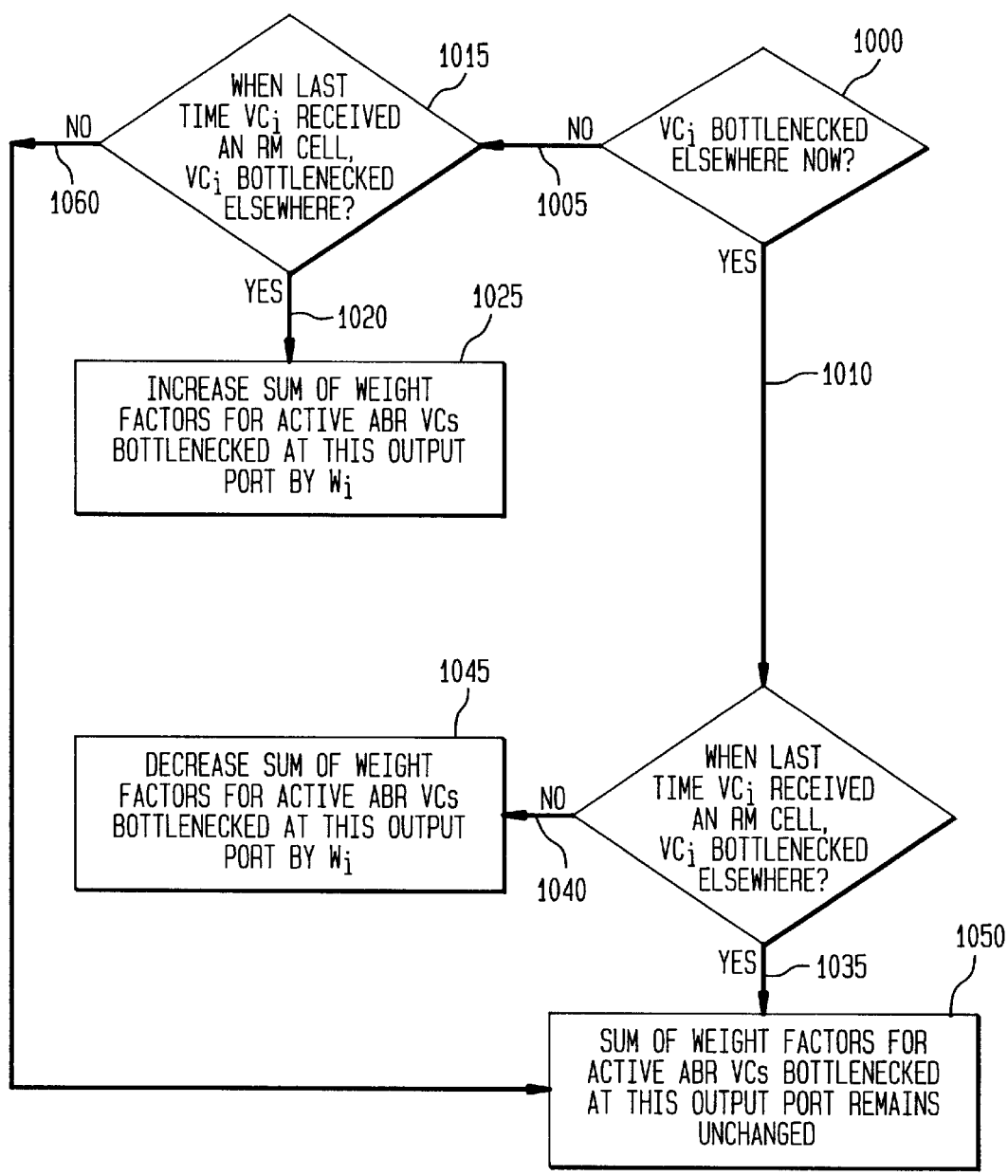
FIG. 10 is a flow chart of the steps a switching system performs to determine the sum of weight factors for active Available Bit Rate virtual circuits that are bottlenecked at an output port of the switching system in accordance with an embodiment of the invention.

FIG. 10 illustrates a flow chart of the steps a Port_Handler preferably performs to determine the new sum of weight factors for active ABR VCs that are bottlenecked at an output port. Port_Handler 330 determines whether a $VC_i$ is currently bottlenecked elsewhere (step 1000). If Port_Handler 330 determines that the $VC_i$ is currently bottlenecked at output port $260_N$ (step 1005), then Port_Handler 330 determines whether, when last time output port $260_N$ received an RM cell for that $VC_i$, the $VC_i$ was bottlenecked elsewhere (step 1015).

If Port_Handler 330 determines that last time the $VC_i$ was bottlenecked at output port $260_N$ (step 1060), then Port_Handler 330 determines that the sum of weight factors for active ABR VCs that are bottlenecked at output port $260_N$ remains unchanged (step 1050). If Port_Handler 330 determines that last time the $VC_i$ was bottlenecked elsewhere (step 1020), then Port_Handler 330 increases the sum of weight factors for active ABR VCs that are bottlenecked at output port $260_N$ by $W_i$ of $VC_i$ (step 1025).

If Port_Handler 330 determines that $VC_i$ is currently bottlenecked elsewhere (step 1010), then Port_Handler 330 determines whether, when last time output port $260_N$ received an RM cell for that $VC_i$, the $VC_i$ was bottlenecked elsewhere (step 1030). If Port_Handler 330 determines that last time the $VC_i$ was bottlenecked at output port $260_N$ (step 1040), then Port_Handler 330 decreases the sum of weight factors for active ABR VCs that are bottlenecked elsewhere by $W_i$ of $VC_i$ (step 1045).

If Port_Handler 330 determines that the $VC_i$ is currently bottlenecked elsewhere (step 1010) and determines that, when last time output port $260_N$ received an RM cell for that $VC_i$, the $VC_i$ was bottlenecked elsewhere (step 1035), then Port_Handler 330 determines that the sum of weight factors for active ABR VCs that are bottlenecked at output port $260_N$ remains unchanged (step 1050).

Figure 11:
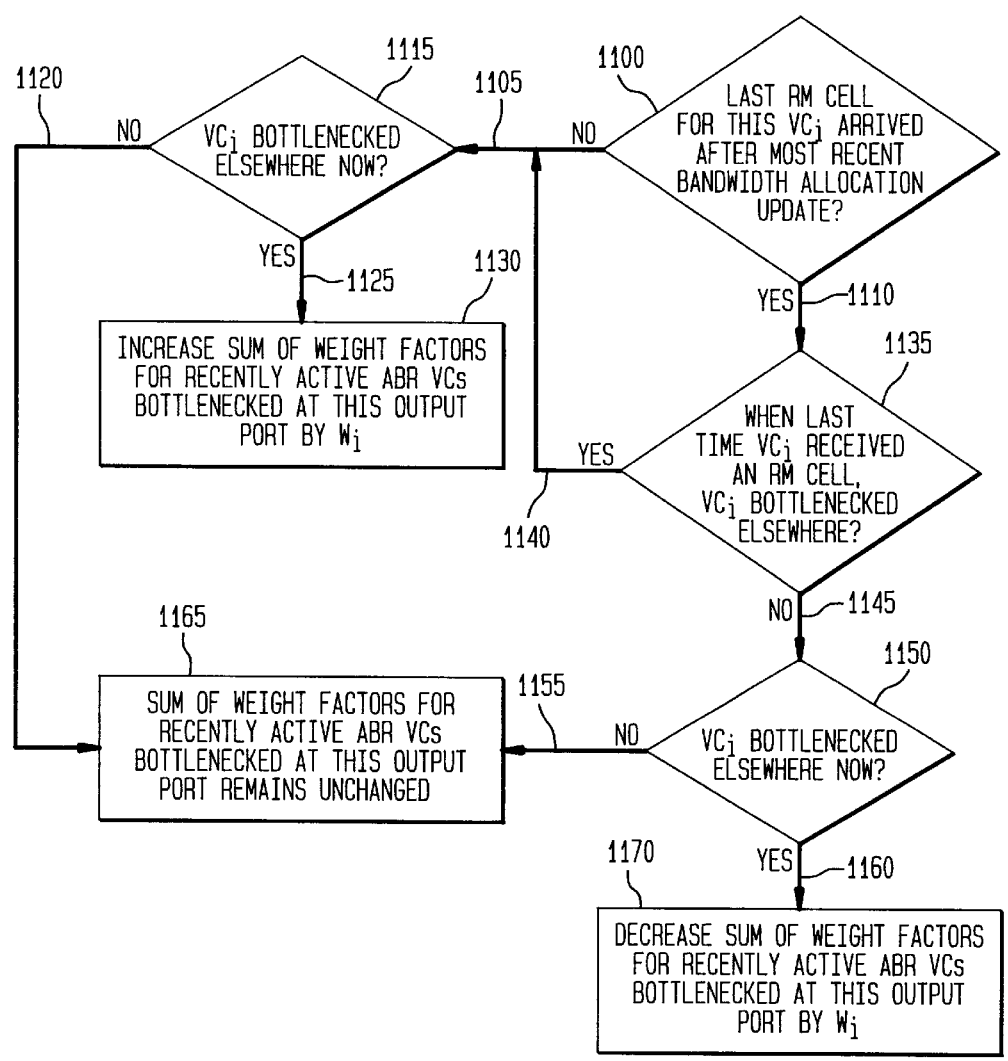
FIG. 11 is a flow chart of the steps a switching system performs to determine the sum of weight factors for recently active Available Bit Rate virtual circuits that are bottlenecked at an output port of the switching system in accordance with an embodiment of the invention.

FIG. 11 illustrates a flow chart of the steps a Port_Handler preferably performs to determine the new sum of weight factors for recently active ABR VCs that are bottlenecked at an output port. If Port_Handler 330 determines that the last RM cell for a $VC_i$ arrived before the most recent bandwidth allocation update (step 1105), then Port_Handler 330 determines whether the $VC_i$ is currently bottlenecked elsewhere (step 1115). If Port_Handler 330 determines that the $VC_i$ is currently bottlenecked at output port $260_N$ (step 1120), then Port_Handler 330 determines that the sum of weight factors for recently active ABR VCs that are bottlenecked at output port $260_N$ remains unchanged (step 1165).

If Port_Handler 330 determines that the last RM cell for the $VC_i$ arrived before the most recent bandwidth allocation update (step 1105) and determines that the $VC_i$ is currently bottlenecked elsewhere (step 1125), then Port_Handler 330 increases the sum of weight factors for recently active ABR VCs that are bottlenecked at output port $260_N$ by $W_i$ of the $VC_i$ (step 1130).

If Port_Handler 330 determines that last RM cell for the $VC_i$ arrived after the most recent bandwidth allocation update (step 1110), then Port_Handler 330 determines whether, when last time output port $260_N$ received an RM cell for that $VC_i$, the $VC_i$ was bottlenecked elsewhere (step 1135). If Port_Handler 330 determines that last time the $VC_i$ was bottlenecked elsewhere (step 1140), then Port_Handler 330 determines whether the $VC_i$ is currently bottlenecked elsewhere (step 1115). If Port_Handler 330 determines that the $VC_i$ is currently bottlenecked at output port $260_N$ (step 1120), then Port_Handler 330 determines that the sum of weight factors for recently active ABR VCs that are bottlenecked at output port $260_N$ remains unchanged (step 1165).

If Port_Handler 330 determines that, when last time output port $260_N$ received an RM cell for that $VC_i$, the $VC_i$ was bottlenecked elsewhere (step 1140) and determines that the $VC_i$ is currently bottlenecked elsewhere (step 1125), then Port_Handler 330 increases the sum of weight factors for recently active ABR VCs that are bottlenecked at output port $260_N$ by $W_i$ of $VC_i$ (step 1130).

If Port_Handler 330 determines that the last RM cell for the $VC_i$ arrived after the most recent bandwidth allocation update (step 1110) and determines that the $VC_i$ was bottlenecked at output port $260_N$ (step 1145), then Port_Handler 330 determines whether the $VC_i$ is currently bottlenecked elsewhere (step 1150). If Port_Handler 330 determines that the $VC_i$ is currently bottlenecked at output port $260_N$ (step 1155), then Port_Handler 330 determines that the sum of weight factors for recently active ABR VCs that are bottlenecked at output port 260N remains unchanged (step 1165).

If Port_Handler 330 determines that the last RM cell for the $VC_i$ arrived after the most recent bandwidth allocation update (step 1110), determines that, when last time output port $260_N$ received an RM cell for that $VC_i$, the $VC_i$ was bottlenecked at output port $260_N$ (step 1145), and determines that the $VC_i$ is currently bottlenecked elsewhere (step 1160), then Port_Handler 330 decreases the sum of weight factors for active ABR VCs that are bottlenecked at output port $260_N$ by $W_i$ of $VC_i$ (step 1170).

Figure 12:
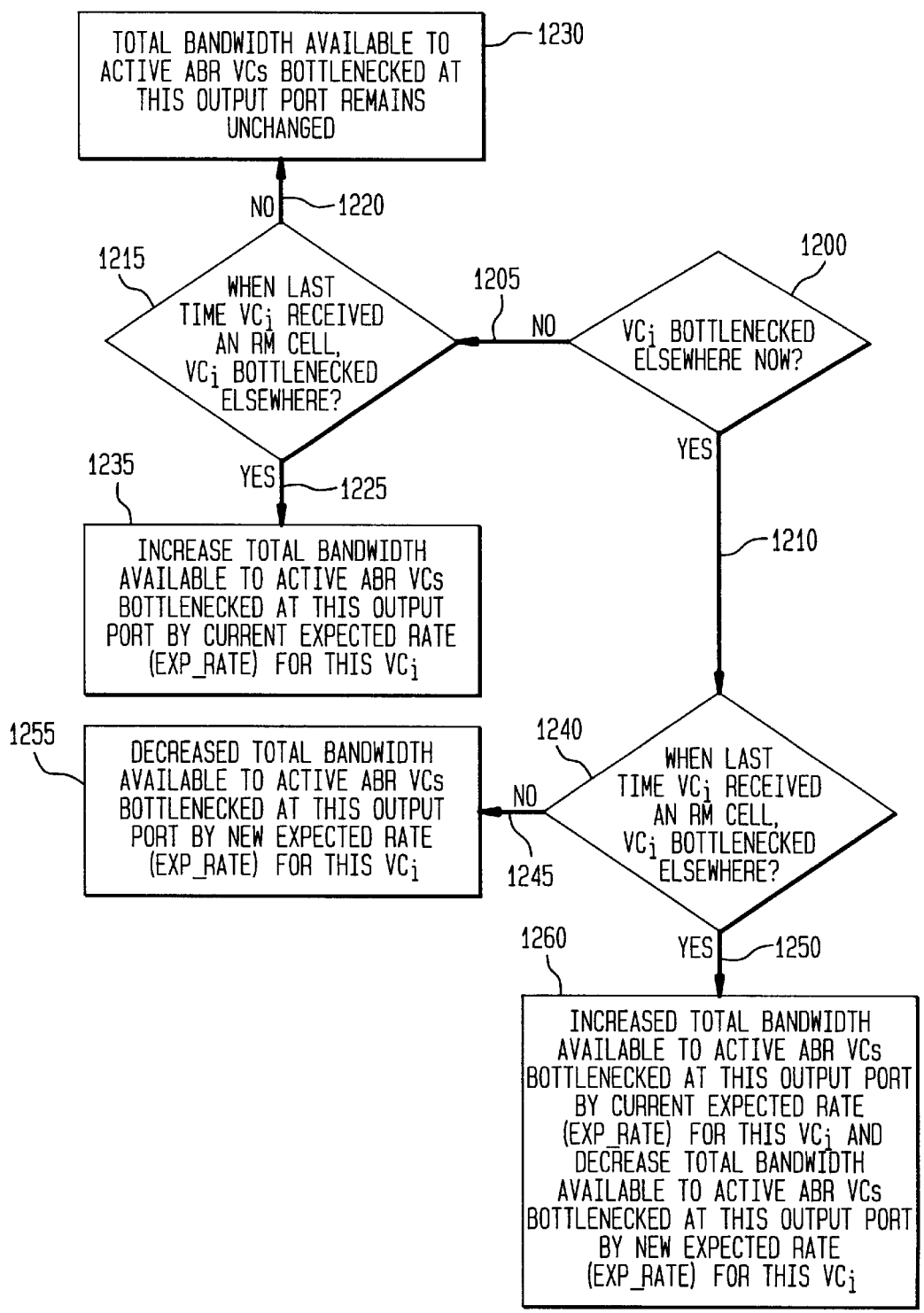
FIG. 12 is a flow chart of the steps a switching system performs to determine the total bandwidth available to active Available Bit Rate virtual circuits that are bottlenecked at an output port of the switching system in accordance with an embodiment of the invention.

FIG. 12 illustrates a flow chart of the steps a Port_Handler preferably performs to determine the new total bandwidth that an output port can make available to active ABR VCs that are bottlenecked at the output port. Port_Handler 330 determines whether a $VC_i$ is currently bottlenecked elsewhere (step 1200). If Port_Handler 330 determines that the $VC_i$ is bottlenecked at output port $260_N$ (step 1205), then Port_Handler 330 determines whether, when last time output port $260_N$ received an RM cell for that $VC_i$, the $VC_i$ was bottlenecked elsewhere (step 1215). If Port_Handler 330 determines that last time the $VC_i$ was bottlenecked at output port $260_N$ (step 1220), then Port_Handler 330 determines that the total bandwidth that output port $260_N$ can make available to active ABR VCs at output port $260_N$ remains unchanged (step 1230).

If Port_Handler 330 determines that $VC_i$ is bottlenecked at output port $260_N$ (step 1205) and determines that, when last time output port $260_N$ received an RM cell for that $VC_i$, the $VC_i$ was bottlenecked elsewhere (step 1225), then Port_Handler 330 increases the total bandwidth that output port $260_N$ can make available to active ABR VCs that are bottlenecked at output port $260_N$ by the current Exp_Rate for the $VC_i$ (step 1235).

If Port_Handler 330 determines that the $VC_i$ is bottlenecked elsewhere (step 1210), then Port_Handler 330 determines whether, when last time output port $260_N$ received an RM cell for that $VC_i$, the $VC_i$ was bottlenecked elsewhere (step 1240). If Port_Handler determines that last time the $VC_i$ was bottlenecked at output port $260_N$ (step 1245), then Port_Handler 330 decreases the total bandwidth available to active ABR VCs that are bottlenecked at output port $260_N$ by the new Exp_Rate for the $VC_i$ (step 1255).

If Port_Handler 330 determines that the $VC_i$ is bottlenecked elsewhere (step 1210) and determines that, when last time output port 260 received an RM cell for that $VC_i$, the $VC_i$ was bottlenecked elsewhere (step 1250), then Port_Handler 330 increases the total bandwidth that output port $260_N$ can make available to active ABR VCs that are bottlenecked at output port $260_N$ by the current Exp_Rate for the $VC_i$ and decreases the total bandwidth that output port $260_N$ can make available to active ABR VCs that are bottlenecked at output port $260_N$ by the new Exp_Rate for the $VC_i$ (step 1260).

BANDWIDTH_ALLOCATION_UPDATE

At fixed time intervals, each output port invokes a corresponding Bandwidth_Allocation_Update program. For example, output port $260_N$ invokes Bandwidth_Allocation_Update 340, which preferably stores the time interval between each invocation in a static memory. The manufacturer of a switching system may set a default for the fixed time interval, which a switching system administrator or network administrator may subsequently reconfigure.

The time interval between each invocation may preferably be twice the upper bound for the time interval between each RM cell generated by an active virtual source. The upper bound may preferably be in the range of $2^{-5}$ milliseconds to 100 milliseconds. Alternatively, the time interval between each invocation may be less than twice the upper bound for the time interval between each RM cell, in which case the time interval between each invocation must still be sufficiently large to allow for arrival of at least one RM cell between two consecutive invocations of Bandwidth_Allocation_Update 340.

Bandwidth_Allocation_Update 340 preferably has access to the global bandwidth parameters stored in memory unit 360 by Port_Handler 330. Specifically, Bandwidth_Allocation_Update 340 has access to the time of the most recent bandwidth allocation update, the time of a second most recent bandwidth allocation update, the total bandwidth available to all ABR VCs (i.e., active and inactive ABR VCs), the total Exp_Rate for active ABR VCs bottlenecked elsewhere, the total Exp_Rate for recently active ABR VCs bottlenecked elsewhere, the total bandwidth available to active ABR VCs bottlenecked at output port $260_N$, the sum of weight factors for active ABR VCs bottlenecked at output port $260_N$, and the sum of weight factors for recently active ABR VCs bottlenecked at the output port $260_N$.

Figure 13:
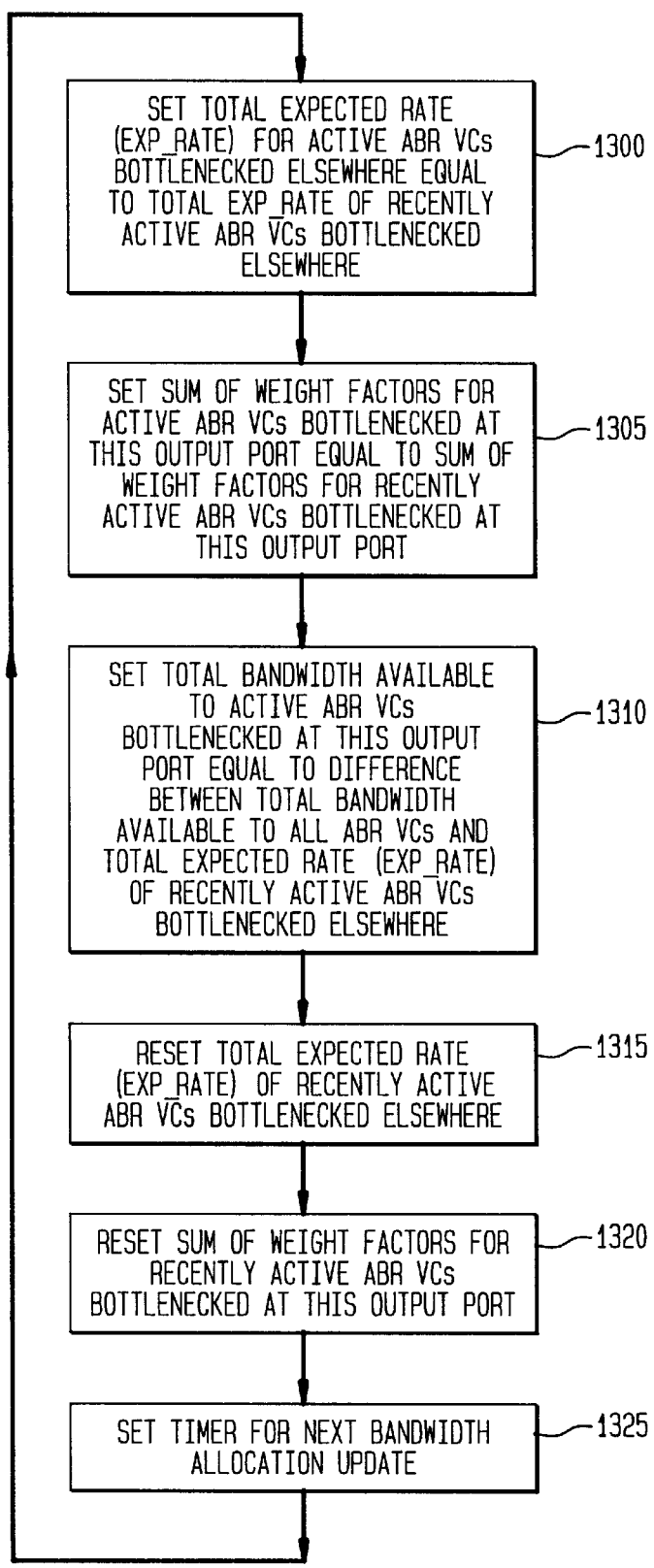
FIG. 13 is a flow chart of the steps a switching system performs to make available a new total bandwidth to active Available Bit Rate virtual circuits that are bottlenecked at an output port of the switching system in accordance with an embodiment of the invention.

FIG. 13 illustrates a flow chart of the steps a Bandwidth_Allocation_Update program preferably performs to make available a new total bandwidth to active ABR VCs that are bottlenecked at an output port, for example output port $260_N$. Bandwidth_Allocation_Update 340 sets the total Exp_Rate for active ABR VCs that are bottlenecked elsewhere equal to the total Exp_Rate for recently active ABR VCs that are bottlenecked elsewhere (step 1300).

Next, Bandwidth_Allocation_Update 340 sets the sum of weight factors for active ABR VCs that are bottlenecked at output port $260_N$ equal to the sum of weight factors for recently active ABR VCs that are bottlenecked at output port $260_N$ (step 1305).

Bandwidth_Allocation_Update 340 then sets the total bandwidth that output port $260_N$ can make available to active ABR VCs that are bottlenecked at output port $260_N$ equal to the difference between the total bandwidth available to all ABR VCs (i.e., active and inactive ABR VCs) and the total Exp_Rate for recently active ABR VCs that are bottlenecked elsewhere (step 1310).

Next, Bandwidth_Allocation_Update 340 resets the total Exp_Rate for recently active ABR VCs that are bottlenecked elsewhere (step 1315). Bandwidth_Allocation_Update 340 then resets the sum of weight factors for recently active ABR VCs that are bottlenecked at output port $260_N$ (step 1320). Finally, Bandwidth_Allocation_Update 340 sets a timer for the next update to the total bandwidth that output port $260_N$ can make available to active ABR VCs that are bottlenecked at output port $260_N$ (step 1325).

To prevent reallocation of bandwidth from a $VC_i$ when an RM cell for the $VC_i$ is lost, for example, due to network congestion for an extended period of time, an ATM network may assign a high priority to RM cells. Alternatively, by keeping the time interval between the updates to the global bandwidth parameters (i.e., invocation of Bandwidth_Allocation_Update) sufficiently large, if an RM cell is lost due to network congestion, the impact to allocation of an optimum bandwidth to the $VC_i$ would be minimal.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for allocating bandwidth to virtual circuits in an asynchronous transfer mode (ATM) switching system, said method comprising the steps of:

determining a set of weighted "cutoffs" for the virtual circuits, respectively, when the switching system receives resource management (RM) cells associated with the virtual circuits;

determining a first total expected rate for recently active virtual circuits that are bottlenecked elsewhere based on the weighted cutoffs;

setting a second total expected rate for active virtual circuits that are bottlenecked elsewhere to the first total expected rate;

determining a total bandwidth available in the switching system for active virtual circuits that are bottlenecked in the switching system based on the first total expected rate.

2. The method of claim 1 further comprising the step of:
setting to zero the first total expected rate.

3. The method according to claim 1, wherein the step of determining a set of weighted cutoffs comprises the steps of:

identifying a set of predetermined weight factors corresponding to the virtual circuits; and determining the weighted cutoffs based on whether each of the virtual circuits is bottlenecked in the switching system.

4. The method of claim 1, wherein the step of determining a total bandwidth available in the switching system for the active virtual circuits comprises the steps of:

determining a difference between a total bandwidth available in the switching system for the virtual circuits and the first total expected rate.

5. A system for allocating bandwidth to virtual circuits in an asynchronous transfer mode (ATM) switching system, comprising:

means for determining a set of weighted cutoffs for the virtual circuits, respectively, when the switching system receives resource management (RM) cells associated with the virtual circuits;

means for determining a first total expected rate for recently active virtual circuits that are bottlenecked elsewhere based on the weighted cutoffs;

means for setting a second total expected rate for active virtual circuits that are bottlenecked elsewhere to the first total expected rate;

means for determining a total bandwidth available in the switching system for active virtual circuits that are bottlenecked in the switching system based on the first total expected rate; and means for setting to zero the first total expected rate.

6. A computer-readable medium capable of configuring an asynchronous transfer mode (ATM) switching system to perform a method for allocating bandwidth to virtual circuits in said switching system, said method comprising the steps of:

determining a set of weighted cutoffs for the virtual circuits, respectively, when the switching system receives resource management (RM) cells associated with the virtual circuits;

determining a first total expected rate for recently active virtual circuits that are bottlenecked elsewhere based on the weighted cutoffs;

setting a second total expected rate for active virtual circuits that are bottlenecked elsewhere to the first total expected rate;

determining a total bandwidth available in the switching system for active vitual circuits that are bottlenecked in the switching system based on the first total expected rate; and setting to zero the first total expected rate.

7. The computer-readable medium according to claim 6, wherein said method further comprises the steps of:

identify a set of pre-determined weight factors corresponding to the virtual circuits; and determining the weighted cutoffs based on whether each of the virtual circuits is bottlenecked in the switching system.

* * * * *